United States Patent
Panchal et al.

(10) Patent No.: US 9,680,953 B2
(45) Date of Patent: Jun. 13, 2017

(54) CACHE AND DELIVERY BASED APPLICATION DATA SCHEDULING

(71) Applicant: Verizon Patent and Licensing Inc., Basking Ridge, NJ (US)

(72) Inventors: Jignesh S. Panchal, Somerset, NJ (US); Raafat Edward Kamel, Little Falls, NJ (US); Sergio Aguirre, Southlake, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 360 days.

(21) Appl. No.: 13/862,821

(22) Filed: Apr. 15, 2013

(65) Prior Publication Data

US 2014/0310371 A1    Oct. 16, 2014

(51) Int. Cl.
G06F 15/173 (2006.01)
H04L 29/08 (2006.01)
H04L 12/14 (2006.01)
H04L 29/06 (2006.01)

(52) U.S. Cl.
CPC ...... H04L 67/2842 (2013.01); H04L 12/1407 (2013.01); H04L 63/108 (2013.01)

(58) Field of Classification Search
CPC ............ H04L 67/2842; H04L 67/1097; H04L 67/2857; H04L 67/06; H04L 47/2416; H04L 47/2483; H04L 41/5009; H04N 21/2402; H04N 21/26216
See application file for complete search history.

(56) References Cited

U.S. PATENT DOCUMENTS

| 2002/0161913 A1* | 10/2002 | Gonzalez | H04L 29/06 709/233 |
| 2003/0069964 A1* | 4/2003 | Shteyn et al. | 709/225 |
| 2004/0111476 A1* | 6/2004 | Trossen | H04L 51/10 709/206 |
| 2007/0109990 A1* | 5/2007 | Bennett | H04L 12/2898 370/328 |
| 2007/0201502 A1* | 8/2007 | Abramson | H04L 67/32 370/429 |
| 2008/0192820 A1* | 8/2008 | Brooks et al. | 375/240.02 |
| 2012/0023236 A1* | 1/2012 | Backholm et al. | 709/226 |
| 2013/0136036 A1* | 5/2013 | Chen | H04W 28/24 370/260 |
| 2013/0238777 A1* | 9/2013 | Raleigh et al. | 709/223 |
| 2014/0149499 A1* | 5/2014 | Pointon et al. | 709/204 |
| 2014/0189121 A1* | 7/2014 | Singhal | H04L 67/1097 709/226 |

FOREIGN PATENT DOCUMENTS

SE    WO 2013165284 A1 * 11/2013 ........... H04L 67/325

* cited by examiner

Primary Examiner — Aftab N. Khan

(57) ABSTRACT

A device receives configuration information that instructs the device about when to send content to a user device. The device also receives content from an application server at a first time, and stores the content. The device determines, based on the configuration information, that the content is to be sent to the user device, and sends the content to the user device based on the determination. The content is sent to the user device at a second time that is later than the first time.

19 Claims, 15 Drawing Sheets

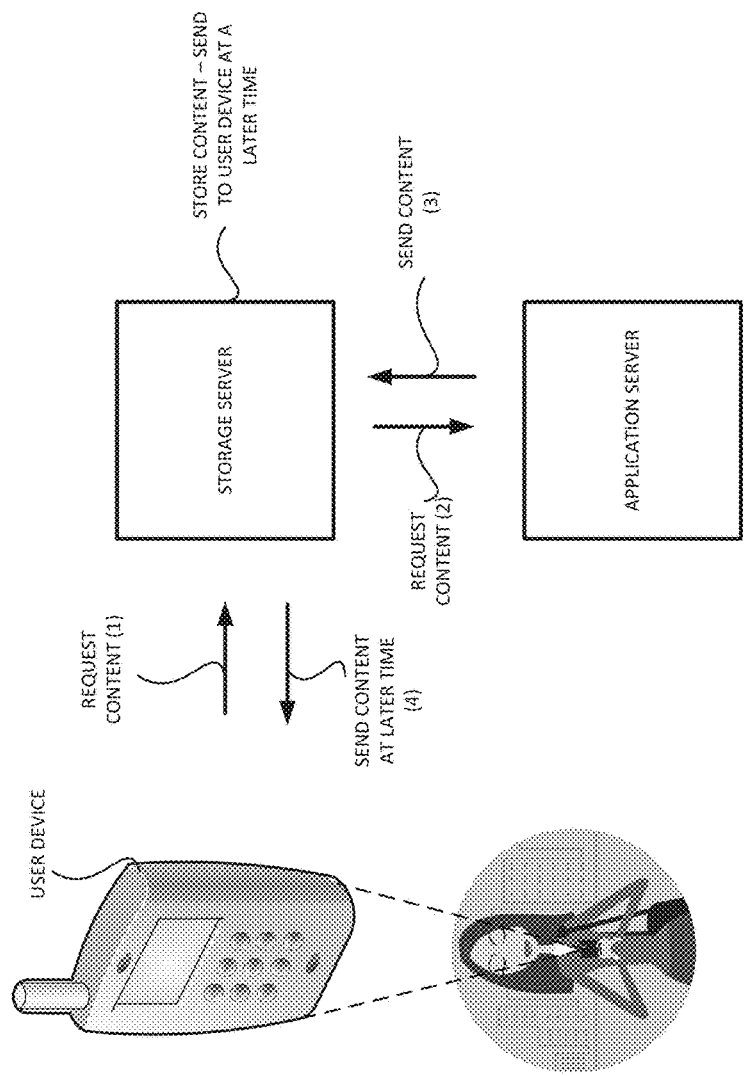

FIG. 8

| TIME 810 | LOCATION 1 820-1 | LOCATION 2 820-2 | ... | LOCATION N 820-N |
|---|---|---|---|---|
| 0$^{TH}$ HOUR | NL (0,1) | NL (0,2) | ... | NL (0,N) |
| 1$^{ST}$ HOUR | NL (1,1) | NL (1,2) | ... | NL (1,N) |
| ... | ... | ... | ... | ... |
| M HOUR | NL (M,1) | NL (M,2) | ... | NL (M,N) |

800

ELLIPSE 822 → NL (0,1)

ELLIPSE 824 → NL (1,2)

| TIME 910 | LOCATION 1 920-1 | LOCATION 2 920-2 | ... | LOCATION N 920-N |
|---|---|---|---|---|
| 0$^{TH}$ HOUR | SE (0,1) | SE (0,2) | ... | SE (0,N) |
| 1$^{ST}$ HOUR | SE (1,1) | SE (1,2) | ... | SE (1,N) |
| ... | ... | ... | ... | ... |
| M HOUR | SE (M,1) | SE (M,2) | ... | SE (M,N) |

ELLIPSE 942 surrounds SE (0,1). ELLIPSE 944 surrounds SE (1,2).

FIG. 9

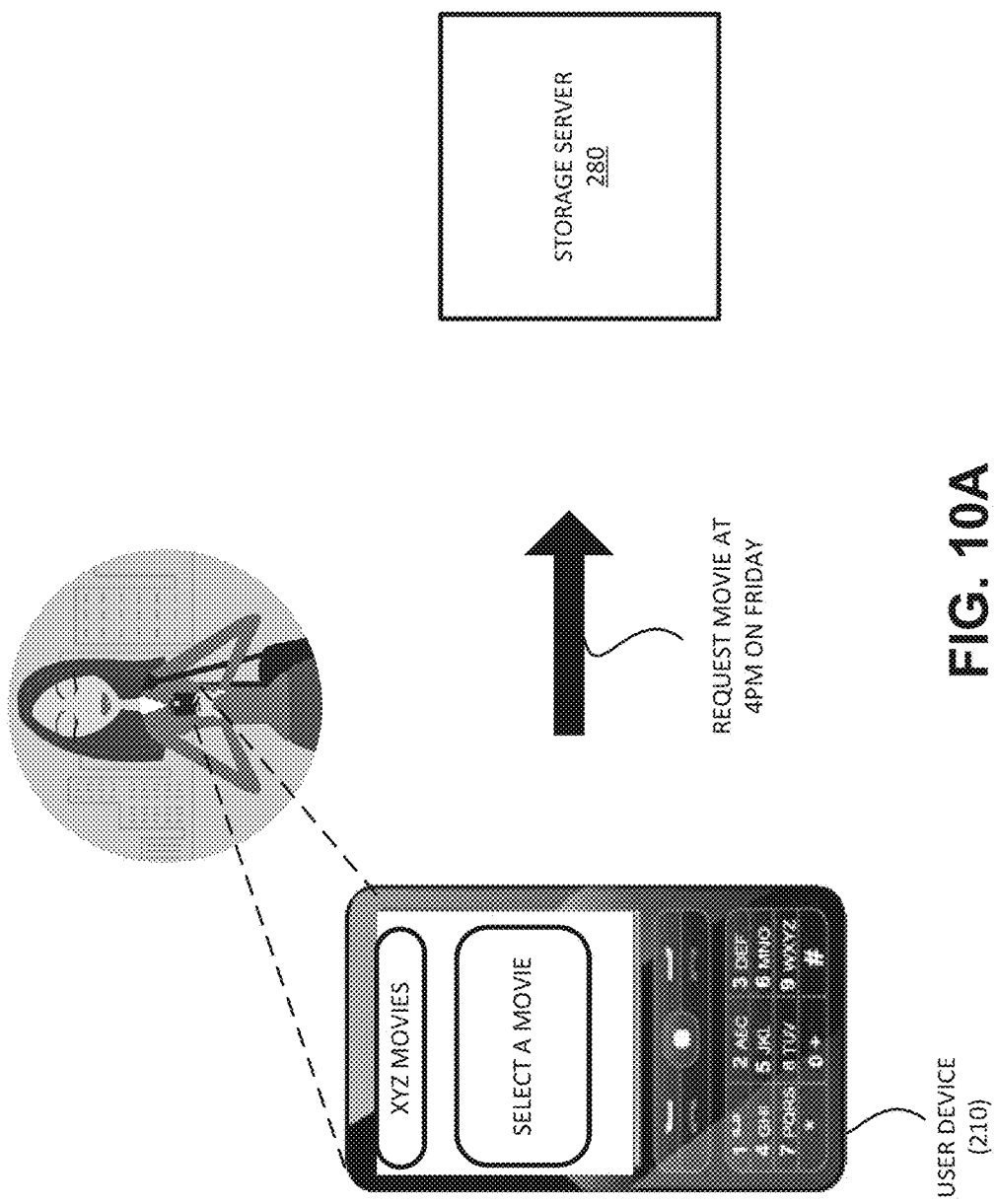

CACHE AND DELIVERY BASED APPLICATION DATA SCHEDULING

BACKGROUND

A user may use various types of applications on a user device (e.g., a smart phone, a tablet computer, etc.). For example, the user may use an application to upload content (e.g., video content) to an application server or use an application to download content from the application server.

BRIEF DESCRIPTION OF DRAWINGS

FIGS. 1A and 1B are diagrams of an overview of an example implementation described herein;

FIG. 8 is a diagram of an example data structure;

FIG. 9 is a diagram of another example data structure;

FIGS. 10A-10C are diagrams of an example of downloading content; and

DETAILED DESCRIPTION OF PREFERRED EMBODIMENTS

The following detailed description refers to the accompanying drawings. The same reference numbers in different drawings may identify the same or similar elements.

A network service provider may provide a threshold quality of service (e.g., a threshold download/upload speed, a threshold signal-to-interference plus noise (SINR) ratio, etc.) for a particular quantity of user devices that are using a network to download/upload content. At times, the network may become congested and/or overloaded. The congestion/overloading may occur when a quantity of user devices using the network (e.g., that are attempting to download/upload content) exceeds the particular quantity of user devices associated with the threshold quality of service. The congestion/overloading may result in the network service provider being unable to provide the threshold quality of service. Systems and/or methods described herein may prevent congestion/overloading in the network by downloading/uploading content to/from a user device at a later time than when a user, of the user device, makes the request to download/upload content. The systems and/or methods may subdue existing congestion/overloading in the network and may minimize a possibility of further network strain.

Figure 1B:
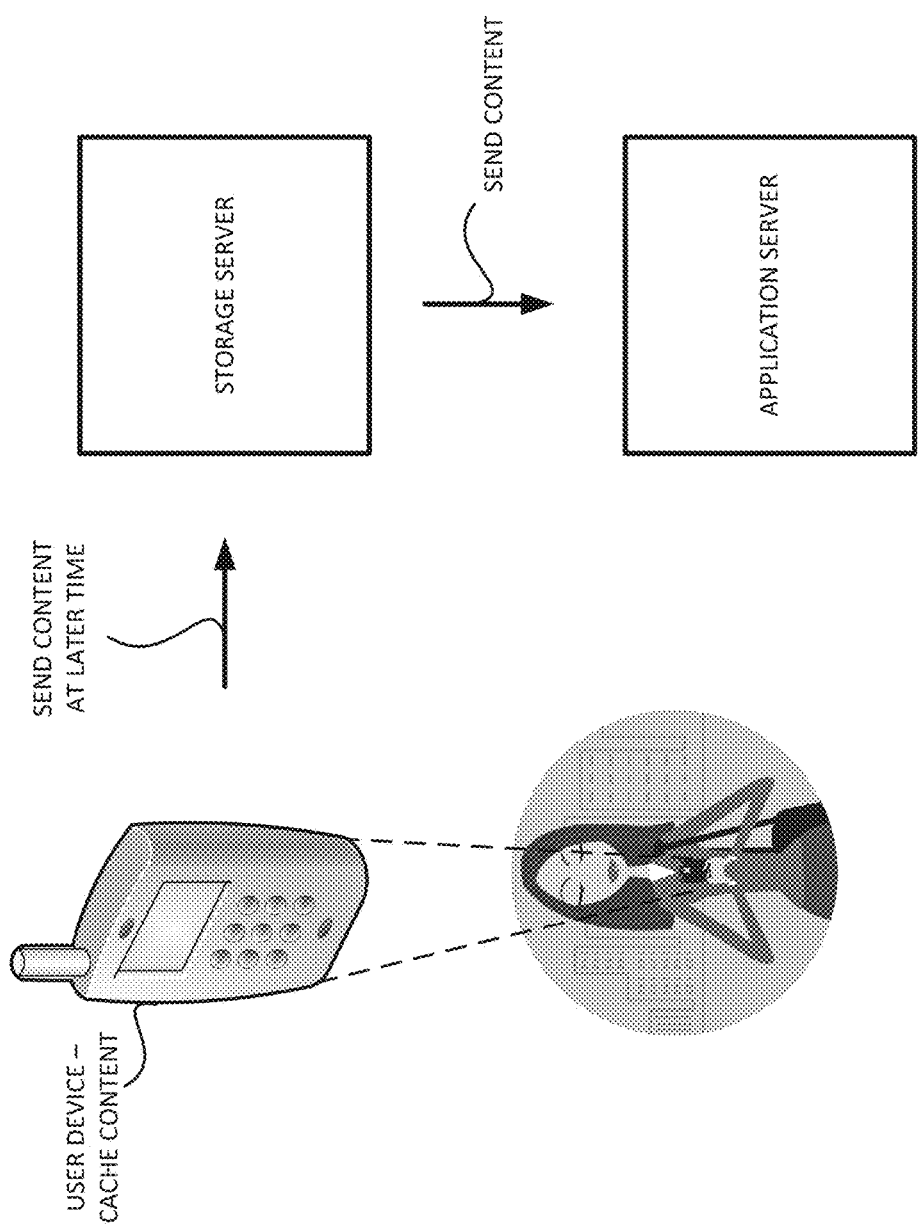

FIGS. 1A and 1B are diagrams of an overview of an implementation described herein. As shown in FIG. 1A, a user, of a user device, may be interested in downloading content to the user device. The content may include video content, audio content, text, and/or any type of information that can be sent to/from the user device. The user, via the user device, may send a request for the content to a storage server (see communication (1)).

The storage server may receive the request and send the request to an application server (see communication (2)). The application server may receive the request and send the content to the storage server (see communication (3)). The storage server may store the content. The storage server may send the content (see communication (4)) to the user device at a later time based on the storage server determining that there is available network capacity, the storage server determining that the content can be downloaded at a speed greater than a threshold, and/or any other reason used by the storage server to determine when to send the content to the user device.

Alternatively, the user may be interested in uploading content to the application server. As shown in FIG. 1B, the user device may cache the content (to be uploaded) within the user device. The storage server may send a message to the user device to request the content cached in the user device, and the user device may send the content to the storage server based on the message. The storage server may send the content to the application server at a later time. For example, the storage server may send the content to the application server when the storage server determines that there is available network capacity, the storage server determines that the content can be uploaded at a speed greater than a threshold, and/or some other reason used by the storage server to determine when to obtain the content from the user device and send the content to the application server.

By downloading/uploading content to/from a user device at a later time rather than immediately downloading/uploading the content, a network service provider may allocate network resources more efficiently. The network service provider may incur less capital expenditures and/or operational expenditures for providing services to its customers and also may prevent congestion within the network. Further, the user may be given financial incentives (e.g., lower monthly fees) to have content downloaded/uploaded at a later time.

Figure 2:
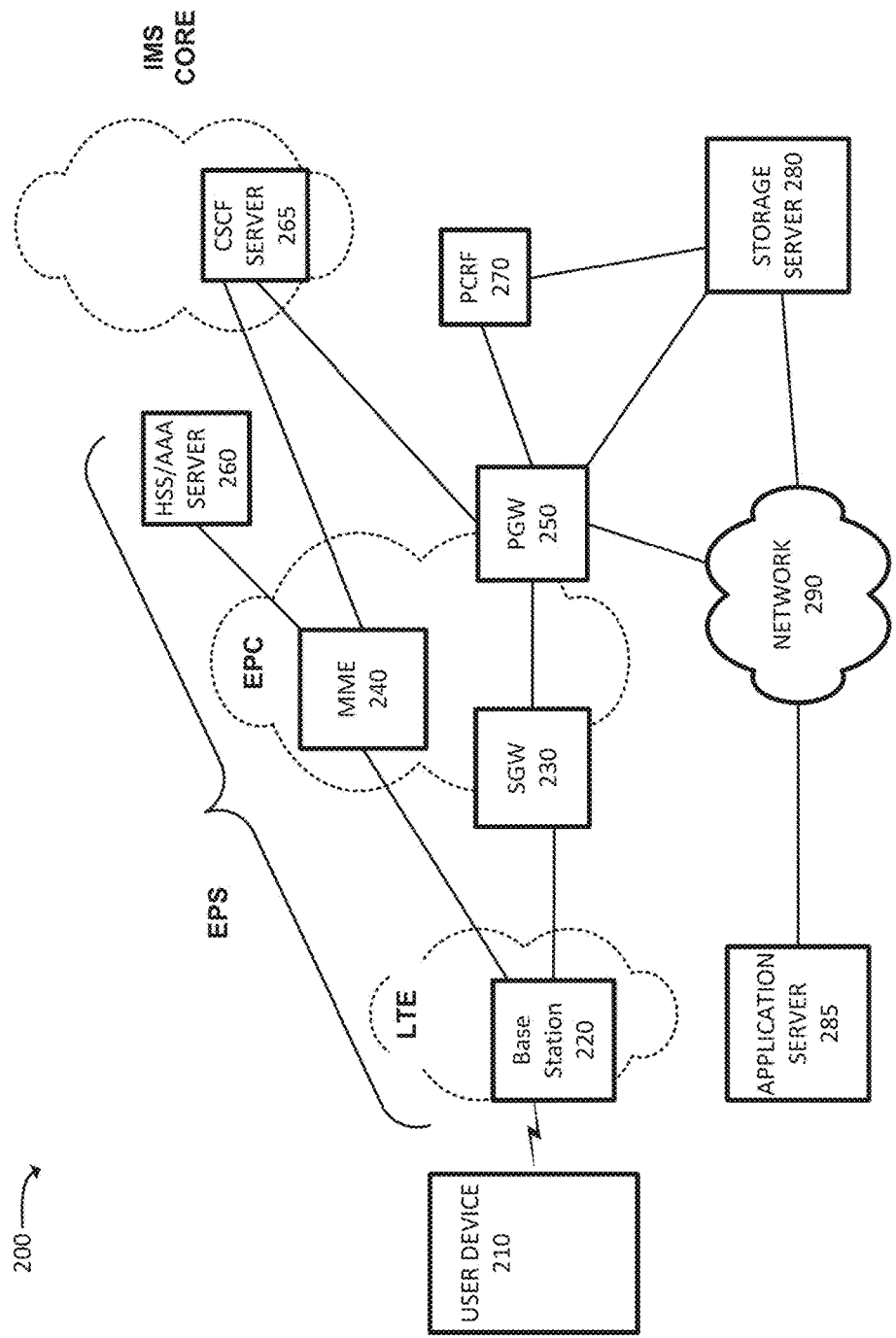
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), a call session control function (CSCF) server 265 (hereinafter referred to as "CSCF server 265"), a policy and charging rules function device 270 (hereinafter referred to as "PCRF 270"), a storage server 280, an application server 285, and a network 290.

Environment 200 may include an evolved packet system (EPS) that includes a long term evolution (LTE) network and/or an evolved packet core (EPC) network that operate based on a third generation partnership project (3GPP) wireless communication standard. The EPS may also include multiple HSS/AAA servers 260. The LTE network may be a radio access network (RAN) that includes one or more base stations, such as eNodeBs (eNBs), via which user device 210 communicates with the EPC network. The EPC network may include SGW 230, MME 240, PGW 250, PCRF 270, and/or storage server 280 and may enable user device 210 to communicate with network 290 and/or an Internet protocol (IP) multimedia subsystem (IMS) network. The IMS network may include multiple CSCF servers 265 and may manage authentication, session initiation, account information, a user profile, etc. associated with user device 210. The access network may include multiple base stations 220, and the EPC network may include multiple SGWs 230, MMEs 240, PGWs 250, PCRFs 270, and/or storage servers 280.

User device 210 may include any computation and communication device that is capable of communicating with a network (e.g., network 290). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, or any other type of mobile, computation, or communication device.

User device 210 may include a variety of applications, such as, for example, a cache application, a gaming application, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a global positioning system ("GPS")-based application), a blogging application, and/or other types of applications (e.g., a word processing application, a spreadsheet application, etc.).

Base station 220 may include one or more network devices that receive, process, and/or transmit traffic, such as audio, video, text, and/or other data, destined for and/or received from user device 210. In some implementations, base station 220 may be an eNB device and may be part of the LTE network. Base station 220 may receive traffic from and/or send traffic to network 290 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices or other types of computation and communication devices. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 290 via PGW 250. In some implementations, SGW 230 may route and forward user data packets, may act as a mobility anchor for a user plane during inter-base station handovers, and may act as an anchor for mobility between LTE and other 3GPP technologies.

MME 240 may include one or more network devices or other types of computation and communication devices. For example, MME 240 may perform operations associated with a handoff to and/or from the EPS. MME 240 may perform operations to register user device 210 with the EPS, to hand off user device 210 from the EPS to another network, to hand off user device 210 from the other network to the EPS, and/or to perform other operations. MME 240 may perform policing operations for traffic destined for and/or received from user device 210.

PGW 250 may include one or more network devices or other types of computation and communication devices. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and packet screening. PGW 250 may also act as an anchor for mobility between 3GPP and non-3GPP technologies.

HSS/AAA server 260 may include one or more network devices or other types of computation and communication devices. For example, HSS/AAA server 260 may manage, authenticate, update, and/or store, in a memory associated with HSS/AAA server 260, profile information that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. In some implementations, HSS/AAA server 260 may include a device that performs authentication, authorization, and/or accounting (AAA) operations associated with a communication session of user device 210.

CSCF server 265 may include one or more network devices or other types of computation and communication devices. CSCF server 265 may process and/or route communications to and from user device 210 via the EPC. For example, CSCF server 265 may process and manage sessions that are associated with audio communications, multimedia calls, video streaming communications, and/or other types of communications that are received from network 290, and that are destined for user device 210. In some implementations, CSCF server 265 may process and manage sessions (as described above) received from user device 210, that are destined for network 290.

PCRF 270 may include one or more network devices or other types of computation and communication devices. PCRF 270 may store subscriber information, such as voice call and data rate plans or quotas for subscribers (e.g., a user of user device 210). PCRF 270 may provide network control regarding service data flow detection, gating, quality of service (QoS), and/or flow based charging. Policies and rules regarding QoS may include policies and rules instructing user device 210 and network devices (e.g., base station 220, SGW 230, MME 240, PGW 250, etc.) to minimize packet loss, to implement a packet delay budget, to provide a guaranteed bit rate (GBR), to provide a particular latency, and/or to perform other activities associated with QoS. PCRF 270 may provide policies and rules to other network devices, such as HSS/AAAS server 260, storage server 280, and/or PGW 250, to implement network control. PCRF 270 may determine how a certain service data flow shall be treated, and may ensure that user plane traffic mapping and QoS is in accordance with a user's profile and/or network policies.

Storage server 280 may include one or more server devices that store content that is received from user device 210 and is to be sent to application server 285 and/or another user device 210. In some implementations, storage server 280 may store content that is received from application server 285 and is to be sent to user device 210. Storage server 280 may determine when to send the content to user device 210 and/or application server 285.

Application server 285 may include one or more server devices, or other types of computation and communication devices, that provide any type of application or application service. For example, application server 285 may provide a content-based application, such as Shutterfly, Skype, Hulu, Netflix, or Vonage, and/or a service related to the application. In some implementations, application server 285 may provide any application that can be used on user device 210 to communicate any content, such as a video stream, an audio stream, a textual stream, and/or any other type or form of content. Application server 285 may provide applications and/or services, such as games, scripts, and/or messaging services that may be used on user device 210.

Network 290 may include one or more wired networks, wireless networks, or a combination of wired and wireless networks. For example, network 290 may include a cellular network, a public land mobile network (PLMN), a second generation (2G) network, a third generation (3G) network, a fourth generation (4G) network, a fifth generation (5G) network, and/or another network. In some implementations, network 290 may include a local area network (LAN), a wide area network (WAN), a metropolitan network (MAN), a telephone network (e.g., the Public Switched Telephone Network (PSTN)), an ad hoc network, a managed Internet protocol (IP) network, a virtual private network (VPN), an intranet, the Internet, a fiber optic-based network, and/or combination of these or other types of networks.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections (e.g., point-to-point microwave links, wireline, or combinations of both), wireless connections, or a combination of wired and wireless connections.

Figure 3:
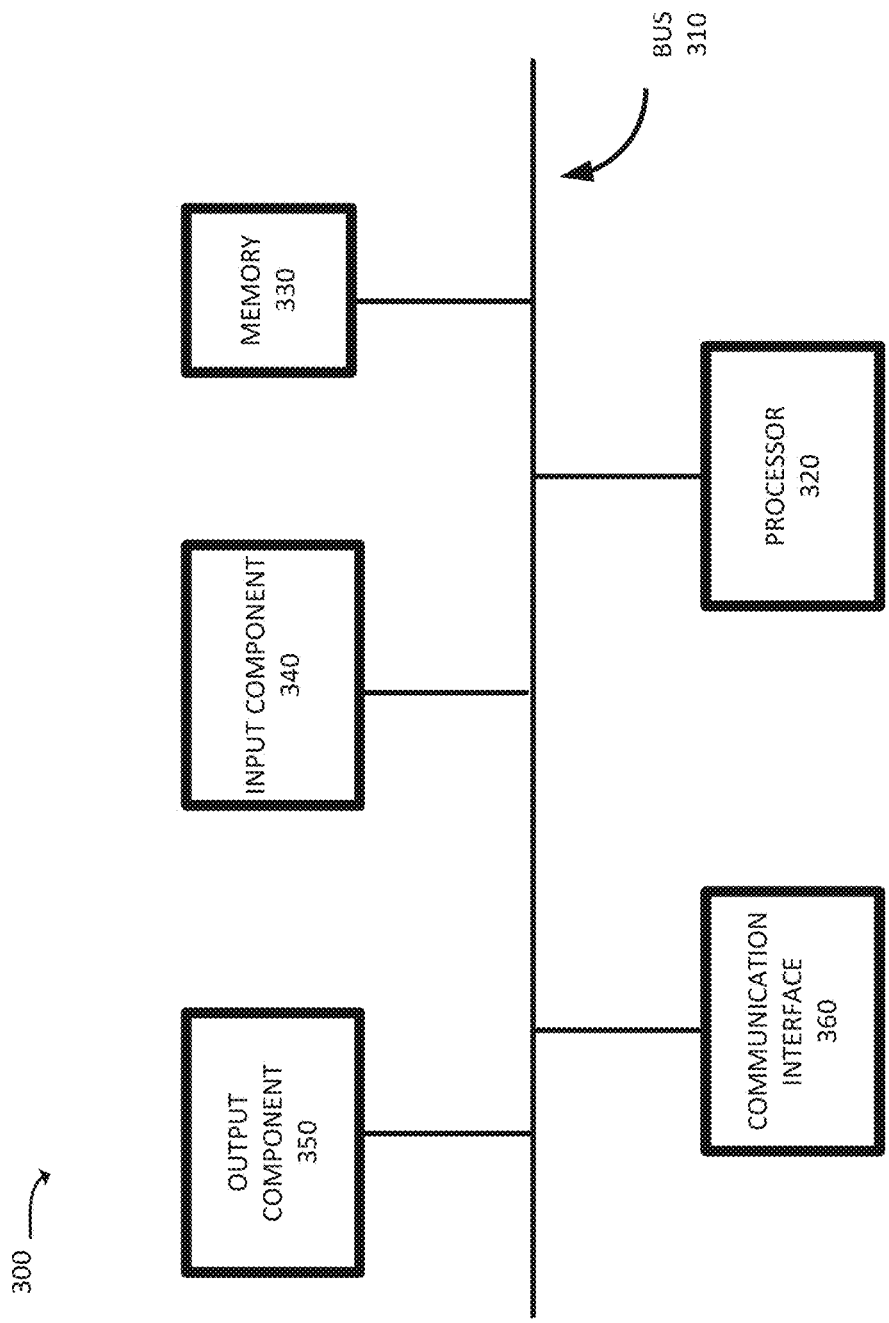
FIG. 3 is a diagram of example components of one or more devices of FIGS. 1A-2.

FIG. 3 is a diagram of example components of a device 300. Device 300 may correspond to user device 210, base station 220, SGW 230, MME 240, PGW 250, HSS/AAA server 260, CSCF server 265, PCRF 270, storage server 280 and/or application server 285. Additionally, or alternatively, each of user device 210, base station 220, SGW 230, MME 240, PGW 250, HSS/AAA server 260, CSCF server 265, PCRF 270, storage server 280 and/or application server 285 may include one or more devices 300 and/or one or more components of device 300.

As shown in FIG. 3, device 300 may include a bus 310, a processor 320, a memory 330, an input component 340, an output component 350, and a communication interface 360. In some implementations, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), an application specific integrated circuit (ASIC), etc.) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a microphone, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, etc.

In some implementations, communication interface 360 may include, for example, a transmitter that may convert baseband signals from processor 320 to radio frequency (RF) signals and/or a receiver that may convert RF signals to baseband signals. In some implementations, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In some implementations, for example, communication interface 360 may communicate with network 290 and/or devices connected to network 290.

As described herein, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

The quantity of components, illustrated in FIG. 3, is provided for explanatory purposes only. In practice, there may be additional components; fewer components; different components; or differently arranged components than illustrated in FIG. 3.

Figure 4:
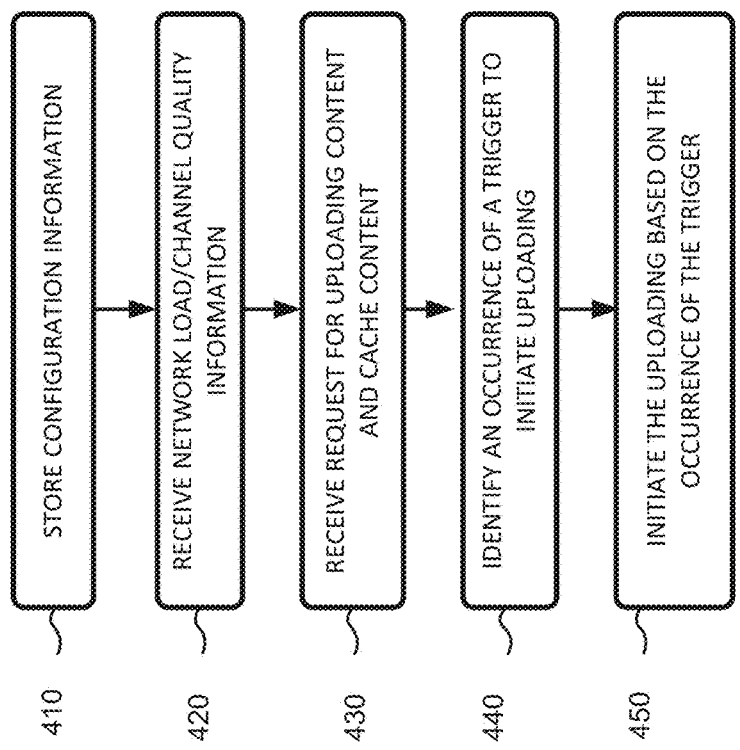
FIG. 4 is a flow chart of an example process for uploading content based on a trigger from a user device.

FIG. 4 is a flow chart of an example process 400 for uploading content based on a trigger from a user device. In some implementations, process 400 may be performed by user device 210. In some implementations, one or more blocks of process 400 may be performed by one or more other devices, such as storage server 280.

Process 400 may include storing configuration information (block 410). For example, user device 210 may store a cache application. A user of user device 210 may configure the cache application to initiate uploading of content from user device 210 at a later time than when a request is made, by the user, to upload content. Thus, the upload may be delayed and may not occur at the time that the user makes the request for the content to be uploaded. The cache application may send the user's configuration to PCRF 270. PCRF 270 may store the user's configuration, and may send the user's configuration to storage server 280.

In some implementations, the user may use the cache application to configure user device 210 to upload content at a particular time. For example, the user may be given a list of off-peak hours. The user's selection from the list may be the particular time during which content may be uploaded. For example, if the user selects 5:00 a.m., then the content from user device 210 may be uploaded from user device 210 at 5:00 a.m.

In some implementations, the cache application may be pre-configured to permit user device 210 to upload content at a particular time. For example, the cache application may be pre-configured to detect a particular time (e.g., 3:00 a.m.) that occurs during off-peak hours when there is a network load that is less than a threshold.

In some implementations, the user may use the cache application to configure user device 210 to upload content when user device 210 is connected to a particular type of network. For example, the particular type of network could be a Wi-Fi network, WiMAX network, and/or any other type of network. In some implementations, the cache application may be pre-configured to instruct user device 210 to upload content when user device 210 is connected to a particular type of network.

In some implementations, the user may use the cache application to configure user device 210 to upload content when the upload speed is equal to, or greater than, a threshold (e.g., 50 Mbps, 100 Mbps, 200 Mpbs, etc.). Instead of a particular speed being presented to the user, the user may be given options that correspond to different speeds. For example, the user may be given an option of "good" upload speed which may correspond to a particular speed, "very good" upload speed which may correspond to another particular speed, and "excellent" upload speed which may correspond to another particular speed.

In some implementations, the cache application may be pre-configured to instruct user device 210 to upload content when the upload speed is greater than a threshold upload speed. For example, a trigger may be pre-configured to instruct user device 210 to upload content if the upload speed, at any time after an upload request is made, is greater than 50 Mbps.

In some implementations, the user may configure the cache application to instruct user device 210 to upload content when the content is associated with a particular application on user device 210. For example, the user may instruct user device 210 to upload content to a movie content application server at a later time, and may instruct user device 210 to upload content to a music content application at the same time that the user makes the request. In some implementations, the cache application may be pre-configured to instruct user device 210 to upload content only when a particular type of application is being used (e.g., only content from a photo application may be uploaded at a later time).

In some implementations, the user may configure the cache application to instruct user device 210 to upload content when user device 210 is located in a particular geographic area. For example, the user may instruct user device 210 to delay the upload of content when user device 210 is being used at the user's residence.

In some implementations, the cache application may be pre-configured to instruct user device 210 to upload content when one or more different types of spectral efficiencies meet different thresholds. The spectral efficiencies may be associated with a reference signal received power (RSRP), a reference signal received quality (RSRQ), a reference signal SINR (RS-SINR), download channel quality indicators (DL-CQI), download modulation and coding schemes (DL-MCS), and/or other types of spectral efficiencies.

In some implementations, the cache application may pre-configured to instruct user device 210 to upload content when the cache application detects that one or more spectral efficiencies satisfy (e.g., are greater or less than) a threshold occurring at a particular time. In some implementations, the cache application may upload content when one or more spectral efficiencies satisfy (e.g., are greater or less than) a threshold, that changes over time (as will be further described in FIG. 9).

In some implementations, the cache application may be pre-configured to instruct user device 210 to upload content when a network load in a particular sector of a network is less than a threshold. In some implementations, the cache application may instruct user device 210 to upload content when a trigger detects that the network load is satisfies (e.g., is less than) a threshold occurring at a particular time. In some implementations, the cache application may instruct user device 210 to upload content when the trigger detects that the network load satisfies (e.g., is less than) a threshold that changes over a period of time (as will be further described in FIG. 8).

In some implementations, the cache application may be pre-configured to instruct user device 210 to upload content from user device 210 when a memory capacity used by user device 210 exceeds a threshold amount of memory capacity. For example, if user device 210 has 50% of its memory storage capacity being used and the threshold is 49%, then this may result in content (stored by storage server 280) being uploaded, to storage server 280, from user device 210.

As further shown in FIG. 4, process 400 may include receiving network load and/or channel quality information (block 420). For example, the cache application (stored by user device 210) may cause user device 210 to receive network load information and/or channel quality information.

The cache application may, for example, cause user device 210 to send a request for network load information to MME 240. The network load information may be associated with a sector of the network within which user device 210 is located. The cache application may request the network load information from MME 240 a particular time intervals (e.g., every hour, every two hours, every day, etc.).

In some implementations, the cache application may cause storage server 280 to receive the network load information from base station 220 whenever there is a change in the network load information. Base station 220 may receive the network load information and send the network load information to storage server 280 whenever user device 210 changes from one sector of the network to another sector of the network.

In some implementations, the cache application may store channel quality information received by user device 210. The channel quality information may be associated with the values, such as, for example, RSRP, RSRQ, RS-SINR, DL-CQI, DL-MCS, and/or other types of parameters associated with the channel quality.

Returning to FIG. 4, process 400 may include receiving a request for uploading content and cache content (block 430). For example, the user may provide instructions to a particular application (stored by user device 210) to upload content. For example, the user may want to upload a photo. The application may communicate with the cache application and the cache application may determine that the content (the photo) is to be cached in user device 210 based on the configuration information (described with regard to block 410).

User device 210 may cache the content within user device 210 (e.g., within the memory of user device 210). The user may instruct user device 210 to send a message, to storage server 280, indicating that content is cached within in user device 210. Storage server 280 may receive the message and may store information that user device 210 has cached content that is to be uploaded to application server 285 at a later time.

As further shown in FIG. 4, process 400 may include identifying an occurrence of a trigger to initiate uploading (block 440). For example, user device 210 may determine the occurrence of one or more of the triggers described with regard to block 410. The trigger may include the network load being less than a threshold, a particular upload speed, a particular time occurring, and/or any other trigger that instructs user device 210 to upload content.

Process 400 may include initiating the uploading of the content based on the occurrence of the trigger (block 450). For example, user device 210 may upload the content from user device 210 to storage server 280 based upon the occurrence of the trigger. User device 210 may establish a communication link (e.g., a transmission control protocol/Internet Protocol (TCP/IP) link, a user datagram protocol (UDP) link, etc.) with storage server 280, and may upload the content to storage server 280 via the communication link.

In some implementations, the communication link between user device 210 and storage server 280 may become disconnected due to loss of power, loss of signal, and/or any other reason. If the communication link is reestablished, user device 210 and storage server 280 may exchange a last received byte and a last transmitted byte of the content that was being uploaded prior to the disconnection. This may permit the upload process to continue from where the upload stopped before the disconnection.

Storage server 280 may receive the content and may send the content to application server 285. In some implementations, storage server 280 may store the content and may send the content to application server 285 at a later time based upon the occurrence of another trigger. The other trigger may also be based on the network load being less than a threshold, a particular time, and/or any other type of trigger as described with regard to block 410.

While a series of blocks has been described with regard to FIG. 4, the order of the blocks may be modified in other implementations. Further, non-dependent blocks may be performed in parallel.

Figure 5:
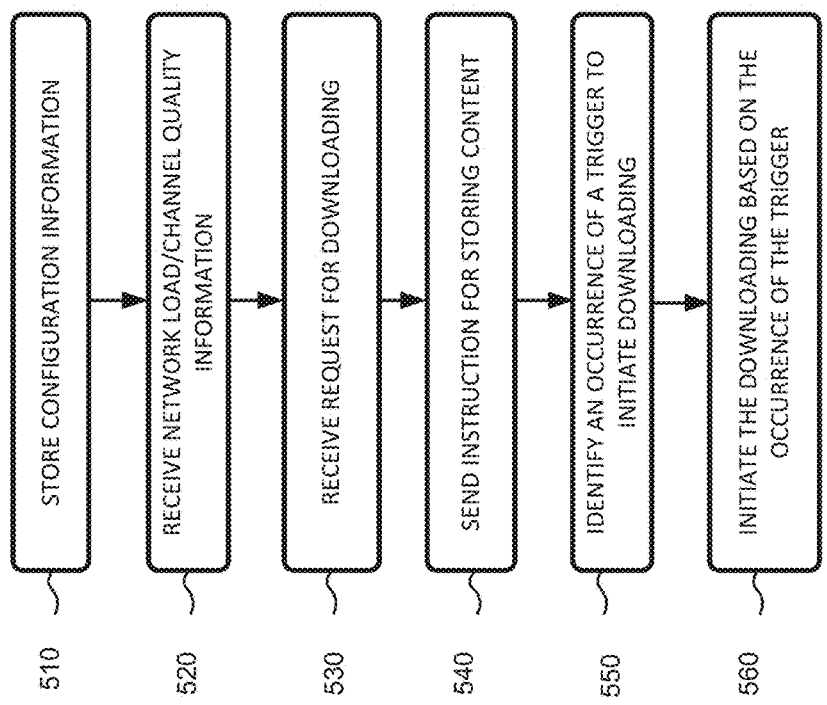
FIG. 5 is a flow chart of an example process for downloading content based on a trigger from a user device.

FIG. 5 is a flow chart of an example process 500 for downloading content based on a trigger from a user device. In some implementations, process 500 may be performed by user device 210. In some implementations, one or more blocks of process 500 may be performed by one or more other devices, such as storage server 280.

Process 500 may include storing configuration information (block 510). For example, user device 210 may store a cache application. The user of user device 210 may configure the cache application to initiate downloading of content to user device 210 at a later time than when a request is made by the user to download content. The initiation of the downloading of content may occur based upon an occurrence of a trigger. The trigger may be one or more of the triggers as described with regard to block 410 in FIG. 4. For example, the trigger may be the network load being less than a particular threshold, a download speed being greater than another threshold, and/or any other type of trigger. The cache application may send the user's configuration to PCRF 270. PCRF 270 may store the user's configuration, and may send the user's configuration to storage server 280.

As further shown in FIG. 5, process 500 may include receiving network load and/or channel quality information (block 520). For example, the cache application may cause user device 210 to receive network load information and/or channel quality information as described with regard to block 420 in FIG. 4.

Returning to FIG. 5, process 500 may include receiving a request for downloading content (block 530). For example, the user may provide instructions to a particular application (stored by user device 210) to download content. For example, the user may want to download content from a particular application. The user may provide instructions, to the particular application, indicating that the user is interested in downloading content (e.g., video content, music content, etc.). The particular application may communicate with the cache application and the cache application may determine that the download request is to be initiated based on the configuration information described with regard to block 410 in FIG. 4.

As further shown in FIG. 5, process 500 may include sending instructions for storing content (block 540). For example, the cache application may cause user device 210 to instruct storage server 280 to receive and store the content requested by the user. Storage server 280 may receive the instructions and may request the content from application server 285. Application server 285 may send the content to storage server 280. Application server 285 and storage server 280 may communicate with each other via TCP/IP link, a user datagram protocol UDP link, and/or any other type of communication link. Storage server 280 may store the received content. Storage server 280 may send a confirmation message, to the cache application, indicating that storage server 280 has received the content.

Returning to FIG. 5, process 500 may include identifying an occurrence of a trigger to initiate downloading (block 550). For example, user device 210 may identify the occurrence of one or more of the triggers described with regard to block 410. The trigger may be a network load being less than a threshold, a particular download speed, a particular time occurring, and/or any other trigger.

Process 500 may include initiating the downloading based on the occurrence of the trigger (block 560). For example, user device 210 may initiate the downloading of content from storage server 280 to user device 210 based upon the occurrence of the trigger. User device 210 may send a message, requesting the content, to storage server 280. Storage server 280 may receive the message and may send the content to user device 210 based on the message.

In some implementations, storage server 280 may establish a communication link, such as a TCP/IP link, a UDP link, and/or any other type of communication link, with user device 210 to download the content. In some implementations, the communication link between user device 210 and storage server 280 may become disconnected due to loss of power, loss of signal, and/or any other reason. If the communication link is reestablished, user device 210 and storage server 280 may exchange a last received byte and a last transmitted byte of the content that was being downloaded prior to the disconnection. This may permit the download process to continue from where the download stopped before the disconnection.

While a series of blocks has been described with regard to FIG. 5, the order of the blocks may be modified in other implementations. Further, non-dependent blocks may be performed in parallel.

Figure 6:
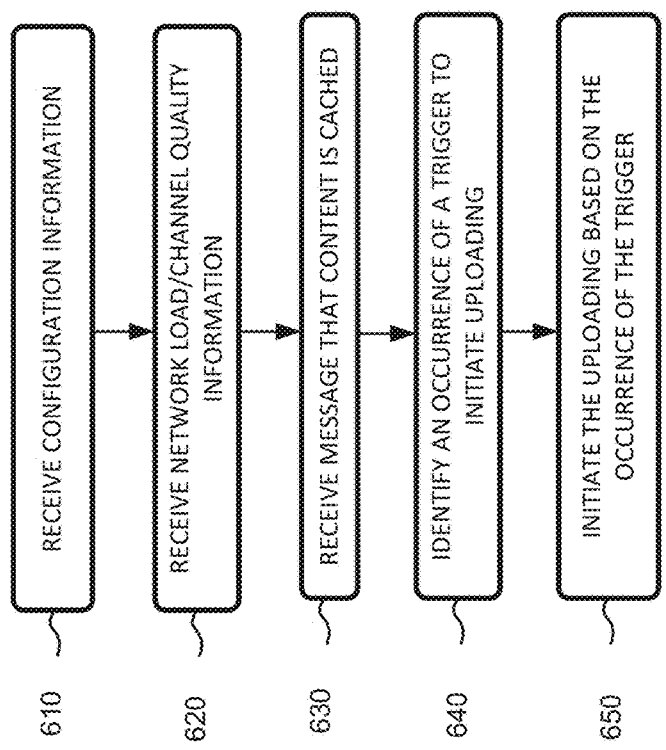
FIG. 6 is a flow chart of an example process for uploading content based on a trigger from a storage server.

FIG. 6 is a flow chart of an example process 600 for uploading content based on a trigger from a storage server. In some implementations, process 600 may be performed by storage server 280. In some implementations, one or more blocks of process 600 may be performed by one or more other devices, such as user device 210.

Process 600 may include receiving configuration information (block 610). For example, user device 210 may store a cache application. The user of user device 210 may configure the cache application to initiate uploading of content from user device 210 at a later time than when the user made the request to upload the content. The cache application may be configured by the user as described with regard to block 410 in FIG. 4. The cache application may send such configuration information to storage server 280, and storage server 280 may receive the configuration information. In some implementations, the cache application may send the user's configuration to PCRF 270. PCRF 270 may store the user's configuration, and may send the user's configuration to storage server 280.

In some implementations, storage server 280 may store pre-configured information regarding when content is to be uploaded from user device 210. For example, storage server 280 may store information indicating that content is to be uploaded from user device 210 when user device 210 is in a particular location.

As further shown in FIG. 6, process 600 may include receiving network load and/or channel quality information (block 620). For example, storage server 280 may send a request for network load information to MME 240. The network load information may be associated with a sector of the network within which user device 210 is located.

Storage server 280 may request the network load information from MME 240 during particular time intervals (e.g., every hour, every two hours, every day, etc.). In some implementations, storage server 280 may receive the network load information from base station 220 whenever there is a change in the network load information. Base station 220 may receive the network load information and may send the network load information to storage server 280 whenever user device 210 changes from one sector of the network to another sector of the network.

In some implementations, storage server 280 may send a request for channel quality information to user device 210. The channel quality information may be associated with the values, such as RSRP, RSRQ, RS-SINR, DL-CQI, DL-MCS, and/or other types of parameters associated with the channel quality.

Returning to FIG. 6, process 600 may include receiving a message indicating that the content is cached (block 630). For example, storage server 280 may receive, from user device 210, a message indicating that content, to be uploaded at a later time, is cached in user device 210. User device 210 may cache the content in a manner similar to that described with regard to FIG. 4. Storage server 280 may send, to user device 210, a confirmation message indicating that server 280 received the message.

As further shown in FIG. 6, process 600 may include identifying an occurrence of a trigger to initiate uploading (block 640). For example, the user may provide instructions to a particular application (stored by user device 210) to download content. In some implementations, the user may want to download a video. The particular application may communicate with the cache application and the cache application may determine that the content (the video) is to be stored in storage server 280 based on the configuration information described with regard to block 410 in FIG. 4. In some implementations, storage server 280 may identify the occurrence of a trigger. For example, storage server 280 may detect that a particular upload time (e.g., 5:00 a.m. on Monday) has occurred.

Returning to FIG. 6, process 600 may include initiating the upload of content based on the trigger (block 650). For example, storage server 280 may send, to the cache application in user device 210, a message indicating that a trigger has occurred. The cache application may receive the message and may send the content cached in user device 210 to storage server 280. User device 210 may establish a communication link (e.g., TCP/IP link, a UDP link, etc.) with storage server 280, and may provide the content to storage server 280 via the communication link.

In some implementations, the communication link between user device 210 and storage server 280 may become disconnected due to loss of power, loss of signal, and/or any other reason. If the communication link is reestablished, user device 210 and storage server 280 may exchange a last received byte and a last transmitted byte of the content that was being downloaded prior to the disconnection. This may permit the download process to continue from where the download stopped before the disconnection.

Storage server 280 may receive the content and may send the content to application server 285. In some implementations, storage server 280 may store the content and may send the content to application server 285 at a later time based upon the occurrence of another trigger. The other trigger may also be based on the network load being less than a threshold, a particular time, and/or any other type of trigger, as described with regard to block 410.

While a series of blocks has been described with regard to FIG. 6, the order of the blocks may be modified in other implementations. Further, non-dependent blocks may be performed in parallel.

Figure 7:
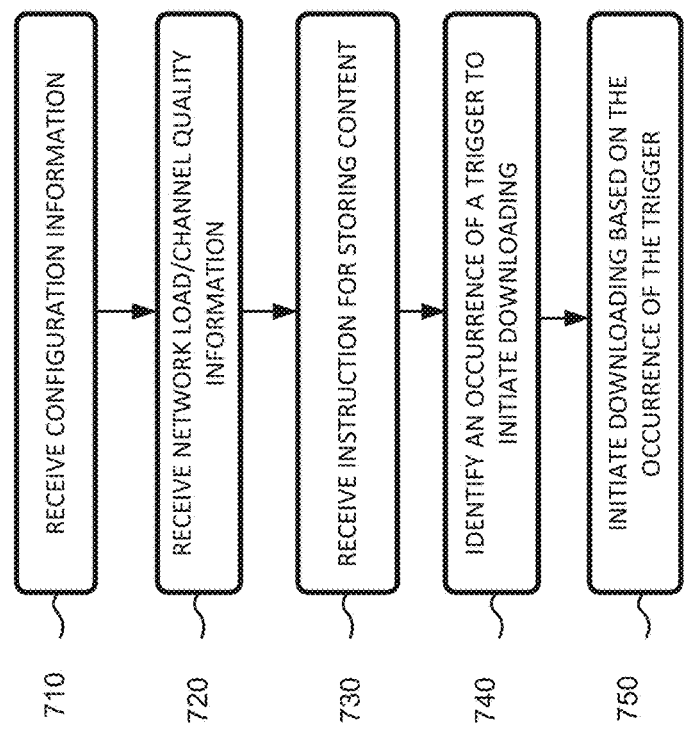
FIG. 7 is a flow chart of an example process for downloading content based on a trigger from a storage server.

FIG. 7 is a flow chart of an example process 700 for downloading content based on a trigger from a storage device. In some implementations, process 700 may be performed by storage server 280. In some implementations, one or more blocks of process 700 may be performed by one or more other devices, such as user device 210.

Process 700 may include receiving configuration information (block 710). User device 210 may store a cache application. The user of user device 210 may configure the cache application to initiate downloading of content to user device 210 at a later time than when a request is made by the user to download content. The initiation of the downloading of content may occur based upon an occurrence of a trigger. The trigger may be one or more of the triggers as configured by the user and described with regard to block 410 in FIG. 4. For example, the trigger may include the network load being less than a particular threshold, a download speed being greater than another threshold, and/or any other type of trigger.

The cache application may send the user's configuration to PCRF 270. PCRF 270 may store the user's configuration, and may send the user's configuration to storage server 280. PCRF 270 may facilitate charging and activation of the cache and deliver functionality described herein. PCRF 270 may incentivize the cache and deliver functionality by reducing user cost per byte rate. Storage server 280 may use the user's configuration to determine that content is to be downloaded to user device 210 when the user device 210 is located within a geographic area. Storage server 280 may send, to user device 210, a confirmation message indicating that storage server 280 has received the configuration information.

In some implementations, storage server 280 may have some or all of the configuration information, described with regard to block 410 in FIG. 4, pre-configured within storage server 280. For example storage server 280 may store configuration information indicating that downloading is to occur during a particular time.

As further shown in FIG. 7, process 700 may include receiving network load and/or channel quality information (block 720). For example, storage server 280 may receive network load information and/or channel quality information in a manner similar to that described with regard to block 620 in FIG. 6.

Returning to FIG. 7, process 700 may include receiving an instruction for storing content (block 730). For example, the user, of user device 210, may initiate an application (e.g., a video application) to download content. The application may communicate with the cache application and the cache application may determine that the content requested by the user is to be downloaded at a later time.

The cache application may cause user device 210 to instruct storage server 280 to receive and store the content requested by the user. Storage server 280 may receive the instructions and may request the content from application server 285. Application server 285 may send the content to storage server 280. Application server 285 and storage server 280 may communicate with each other via a communication link, such as a TCP/IP link, a UDP link, and/or any other type of communication link.

As further shown in FIG. 7, process 700 may include identifying an occurrence of a trigger to initiate downloading (block 740). For example, storage server 280 may determine that a trigger has occurred and may initiate downloading of content to user device 210. The trigger may be one or more of the triggers described with regard to block 410 in FIG. 4. For example, storage server 280 may determine that the download speed is greater than a threshold.

Process 700 may include initiating the downloading based on the occurrence of the trigger (block 750). For example, storage server 280 may determine that the trigger has occurred (described with regard to block 740) and may send the content, stored by storage server 280, to user device 210 based on the trigger.

In some implementations, storage server 280 may establish a communication link such as a TCP/IP link, a UDP link, and/or any other type of communication link with user device 210. The communication link between user device 210 and storage server 280 may become disconnected due to loss of power, loss of signal, and/or any other reason. If the communication link is reestablished, user device 210 and storage server 280 may exchange a last received byte and a last transmitted byte of the content that was being downloaded prior to the disconnection. This may permit the download process to continue from where the download stopped before the disconnection.

While a series of blocks has been described with regard to FIG. 7, the order of the blocks may be modified in other implementations. Further, non-dependent blocks may be performed in parallel.

FIG. 8 is a diagram of an example data structure 800 that may store network load information based on time and location. In some implementations, there may be more than one data structure 800, and each data structure 800 may be associated with a different user device 210. In some implementations, storage server 280 may store some or all of data structure 800. In some implementations, user device 210 may store some or all of data structure 800. In some implementations, data structure 800 may be stored in memory, associated with another device or a group of devices, separate from, or in combination with memory associated with user device 210 and/or storage server 280.

Data structure 800 may include a collection of fields, such as a time field 810, a location field 820-1, a location 2 field 820-2, . . . , a location field 820-N (N≥1) (referred to generally as "location fields 820" and individually as "location field 820").

Time field 810 may store information that identifies a particular time during which storage server 280 may receive network load information from MME 240. Data structure 800 may store network load information for different instances of time.

Location field 820 may store network load information associated with a particular geographic location that is associated with a particular time in time field 810.

Ellipse 822 may, for example, store a network load that occurs at a $0^{th}$ hour and at location 1 (shown as NL(0,1)). Ellipse 824 may, for example, store the network load that occurs at a $1^{st}$ hour and location 2 (shown as NL (1,2)). Storage device 280 may determine a pattern of network load by analyzing different network loads that are associated with different times and locations, such as ellipse 822 and/or ellipse 824. By determining a pattern, storage server 280 may determine when the network load would meet one or more threshold criteria and use the pattern to determine a particular time and/or geographic location that may be used by storage server 280 and/or user device 210 to download/upload content.

In some implementations, storage server 280 may calculate a threshold network load value based on different times and/or locations. Storage server 280 or user device 210 may compare the network load, occurring, for example, at a particular time, to this calculated threshold network load value to determine when to download/upload content.

While FIG. 8 shows example fields 810 and 820, in some implementations, data structure 800 may include fewer fields, different fields, additional fields, and/or differently arranged fields than depicted in FIG. 8.

FIG. 9 is a diagram of an example data structure 900 that may store spectral efficiency information based on time and location. In some implementations, there may be more than one data structure 900, and each data structure 900 may be associated with a different user device 210. In some implementations, storage server 280 may store some or all of data structure 900. In some implementations, user device 210 may store some or all of data structure 900. In some implementations, data structure 900 may be stored in memory, associated with another device or a group of devices, separate from, or in combination with memory associated with user device 210 and/or storage server 280.

Data structure 900 may include a collection of fields, such as a time field 910, a location field 920-1, a location 2 field 920-2, . . . , a location field 920-N (N≥1) (referred to generally as "location fields 920" and individually as "location field 920).

Time field 910 may store information that uniquely identifies a particular time during which storage server 280 may receive spectral efficiency information from MME 240. Data structure 900 may store spectral efficiency for different instances of time.

Location field 920 may store spectral efficiency information associated with a particular geographic location that is associated with a particular time in time field 910.

Ellipse 942 may, for example, store a spectral efficiency that occurs at a $0^{th}$ hour and at location 1 (shown as SE(0,1)). Ellipse 944 may, for example, store a spectral efficiency that occurs at a $1^{st}$ hour and at location 2 (shown as SE(1,2)). User device 210 and/or storage device 280 may determine a pattern of spectral efficiency values by analyzing different spectral efficiencies that are associated with different times and locations, such as ellipse 942 and/or ellipse 944. By determining a pattern, user device 210 and/or storage device 280 may determine when the spectral efficiency value would meet one or more threshold criteria. User device 210 and/or storage device 280 may use the pattern to determine a particular time and/or geographic location that may be used by storage server 280 and/or user device 210 to download/upload content.

In some implementations, user device 210 and/or storage device 280 may calculate a spectral efficiency value based on different times and/or locations. User device 210 and/or storage device 280 may compare the spectral efficiency information, occurring, for example, at a particular time, to a calculated threshold network load value to determine when to download/upload content.

While FIG. 9 shows example fields 910 and 920, in some implementations, data structure 900 may include fewer fields, different fields, additional fields, and/or differently arranged fields than depicted in FIG. 9.

Figure 10B:
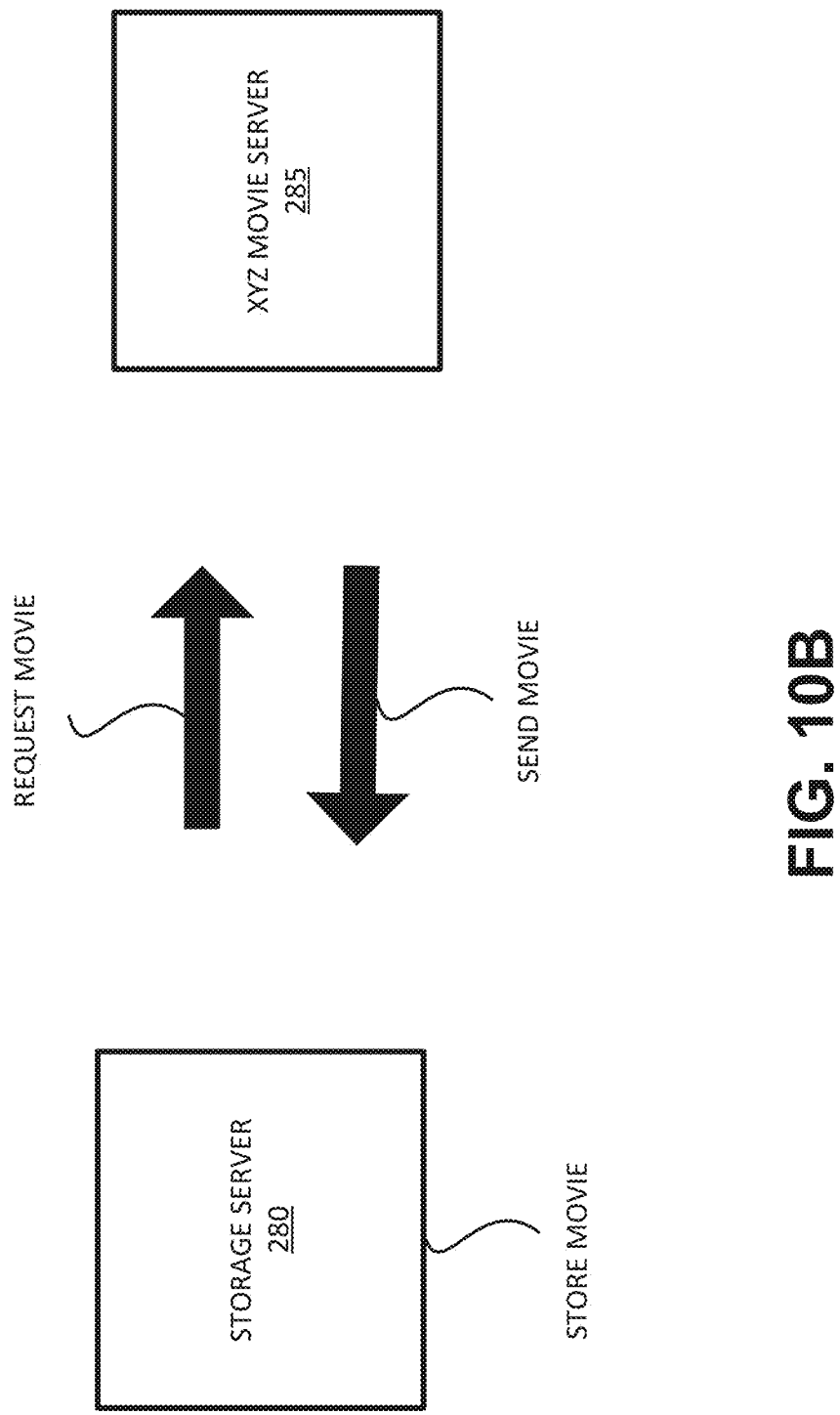
Figure 10C:
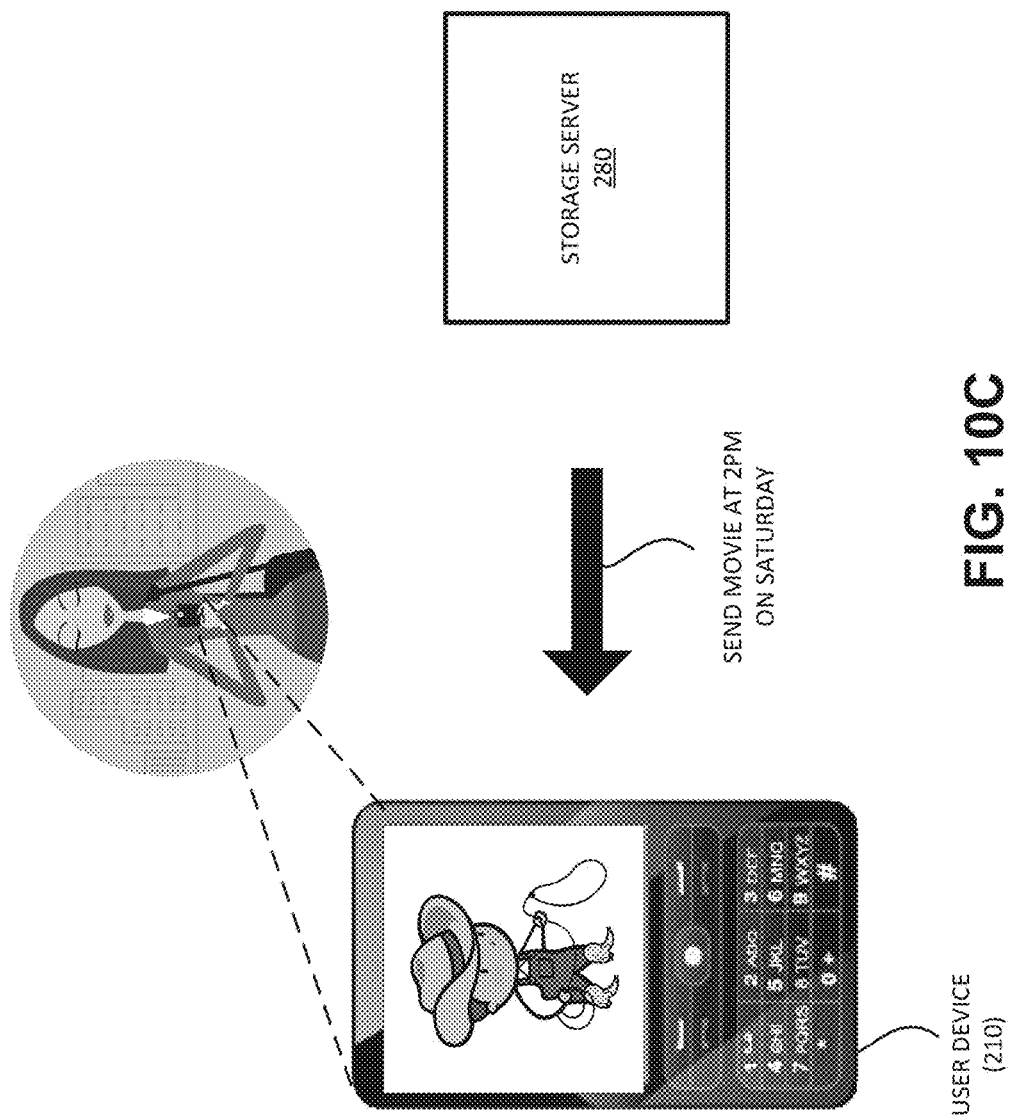

FIGS. 10A-10C are diagrams of an example of downloading content. As shown in FIG. 10A, a user of user device 210 is interested in downloading a movie from an XYZ movies application (stored on user device 210). Assume that the user selects a movie at 4:00 p.m. on Friday. Based upon the user's selection, a message is sent from user device 210 to storage server 280. Storage server 280 may receive the message. As shown in FIG. 10B, storage server 280 may request the movie from an XYZ movie server (e.g., an application server 285). XYZ movie server 285 may send the movie to storage server 280. Storage server 280 may determine that the movie is to be sent to user device 210 at 2:00 p.m. on Saturday. Assume that storage server 280 has been configured to send content from XYZ movie server 285 to user device 210 only on Saturday at 2:00 p.m. At 2:00 p.m. on Saturday, storage server 280 may send the movie to user device 210 as shown in FIG. 10C. This may enable the content to be downloaded at a time when a network is less congested.

Figure 11A:
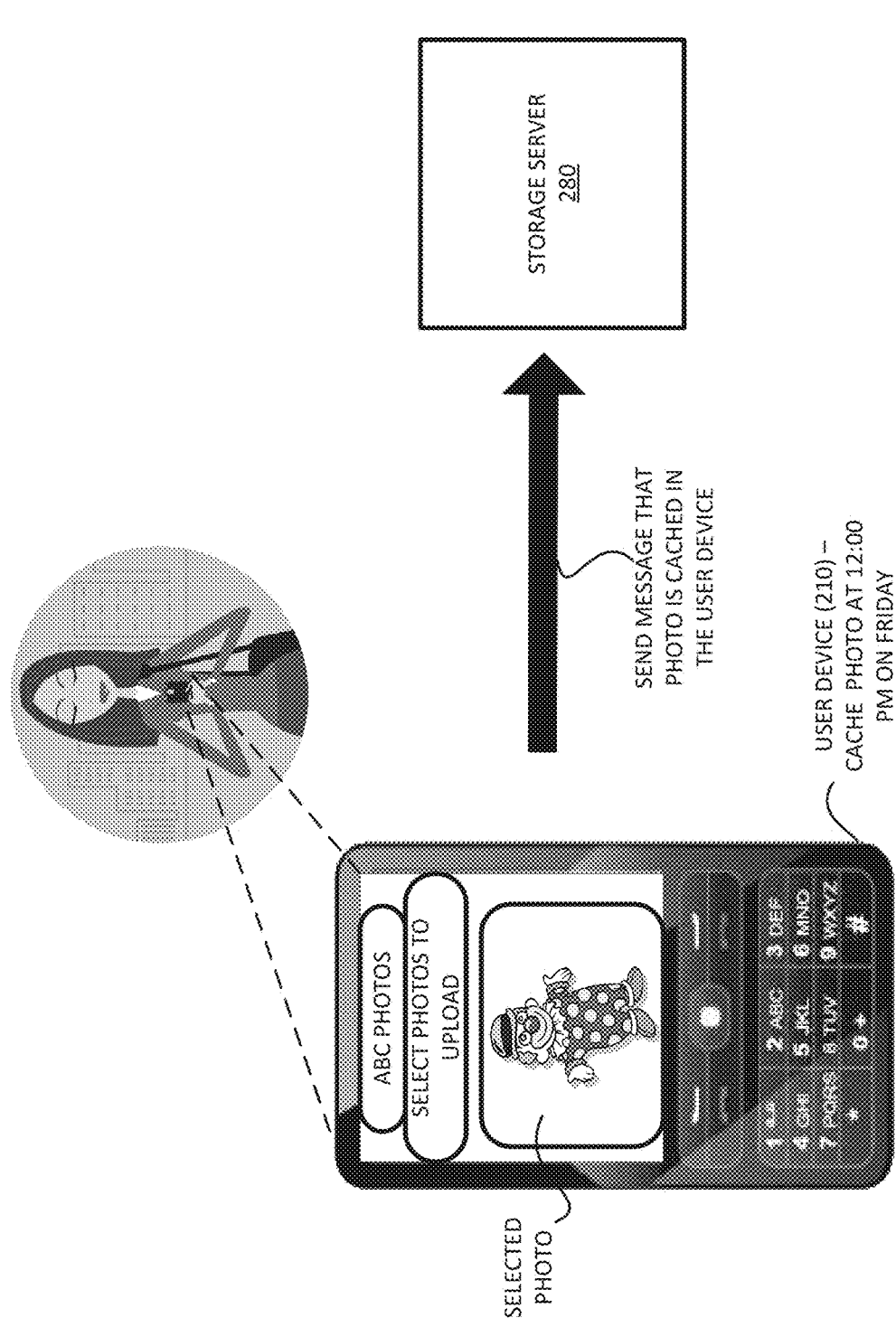
FIGS. 11A and 11B are diagrams of an example of uploading content.
Figure 11B:
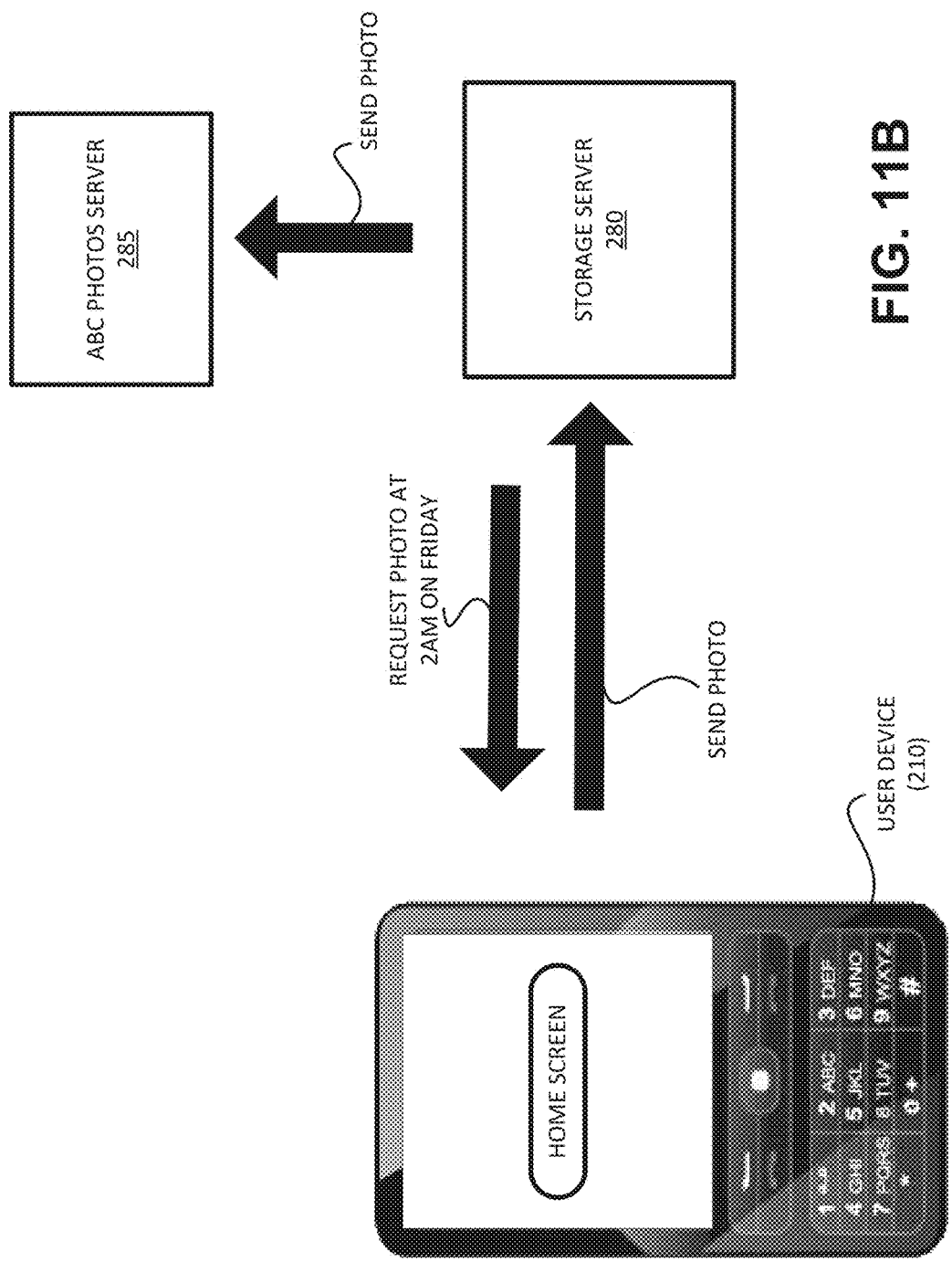

FIGS. 11A and 11B are diagrams of an example of uploading content. As shown in FIG. 11A, a user of user device 210 is interested in uploading digital photos by using an ABC photos application. The user has selected, to upload, a photo from a recent birthday party event. Assume that the user has configured user device 210 to cache content associated with the ABC photos application. As shown in FIG. 11A, user device 210 may cache the photo at 12:00 p.m. on Friday. Additionally, user device 210 may send, to storage server 280, a message indicating that the photo is cached in user device 210. Storage server 280 may receive the message and may determine that the cached photo is available for uploading.

Assume that storage server 280 has been configured to initiate the uploading of the photo at 2:00 a.m. on Saturday. As shown in FIG. 11B, storage server 280 may request the photo from user device 210 at 2:00 a.m. on Friday. User device 210 may receive the request and may send the photo to storage server 280. Storage server 280 may send the photo to an ABC Photos server (e.g., an application server 285).

While the examples described above may use a LTE network (described with regard to FIG. 2) to download/upload content, a cellular network, a Wi-Fi network, or any other type of network may be used to download/upload content between user device 210 and storage server 280. A network, different from the LTE network, may include devices that provide similar functions as MME 240, PGW 250, and PCRF 270.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A user device comprising:
a memory storing content; and
one or more processors at least partially implemented in hardware and operatively connected to the memory, the one or more processors to:
receive configuration information,
the configuration information instructing the user device about when to send the content to a storage device, the configuration information indicating an upload speed threshold selected by a user of the user device for communicating the content via a service provider network;

send the configuration information to a policy and charging rules function device included in the service provider network;

receive a request from a user of the user device to send the content, from the memory, to an application server via the storage device, the storage device being included in an evolved packet system of the service provider network, the storage device facilitating communication, via the service provider network, of the content between the user device and the application server which is communicatively coupled to but not included in the service provider network;

determine, based on the configuration information, whether the content is to be sent to the application server via the storage device based on whether an upload speed satisfies the upload speed threshold selected by the user, when the determining whether the content is to be sent, the one or more processors are to:

wait until the upload speed is detected to satisfy the upload speed threshold selected by the user before sending the content to the application server via the storage device;

cache the content, by the user device and based on receiving the request from the user of the user device to send the content to the application server, while waiting until the upload speed is detected to satisfy the upload speed threshold;

send a message to the storage device that the content is cached to be uploaded to the application server at a later time; and send the content to the application server via the storage device based on the upload speed satisfying the upload speed threshold selected by the user, the content being sent to the application server via the storage device after the request is received.

2. The user device of claim 1, where, when the determining whether the content is to be sent to the application server via the storage device, the one or more processors are to:

determine, based on the configuration information, that a network load is less than a network load threshold,
the network load threshold being stored in the memory of the user device; and determine that the content is to be sent to the application server via the storage device based on the network load being less than the network load threshold.

3. The user device of claim 1, where, when the determining whether the content is to be sent to the application server via the storage device, the one or more processors are to:

determine that a particular time has occurred; and determine that the content is to be sent to the application server via the storage device based on an occurrence of the particular time.

4. The user device of claim 1, where, when the determining whether the content is to be sent to the application server via the storage device, the one or more processors are to:

determine that the user device is in a particular location; and determine that the content is to be sent to the application server via the storage device based on the user device being in the particular location.

5. The user device of claim 1, where the one or more processors are further to:

determine to upload other content from the user device to the storage device based on a memory capacity used by the user device exceeding a threshold amount of memory capacity; and send the other content to the storage device for storage.

6. The user device of claim 1, where the one or more processors are further to:

configure a cache application using the configuration information,
the cache application being configured to cache content for a plurality of applications stored on the user device, and
the user device using the cache application to cache the content and to send the content to the application server.

7. The user device of claim 1, where the one or more processors, when the receiving the configuration information, are to: receive the configuration information from the user of the user device.

8. A method comprising:

receiving, by a user device, configuration information,
the configuration information instructing the user device about when to send content to a storage device,
the configuration information indicating an upload speed threshold selected by a user of the user device for communicating the content via a service provider network;

sending, by the user device, the configuration information to a policy and charging rules function device included in the service provider network;

receiving, by the user device, a request from a user of the user device to send the content, from a memory associated with the user device, to an application server via the storage device,
the storage device being included in an evolved packet system of the service provider network,
the storage device facilitating communication, via the service provider network, of the content between the user device and the application server which is communicatively coupled to but not included in the service provider network;

determining, by the user device and based on the configuration information, whether the content is to be sent to the application server via the storage device based on whether an upload speed satisfies the upload speed threshold selected by the user,
the determining whether the content is to be sent including:
waiting until the upload speed is detected to satisfy the upload speed threshold selected by the user before sending the content to the application server via the storage device;

caching, by the user device and based on receiving the request from the user of the user device to send the content to the application server, the content while waiting until the upload speed is detected to satisfy the upload speed threshold;

sending, by the user device, a message to the storage device that the content is cached to be uploaded to the application server at a later time; and sending, by the user device, the content to the storage device based on the upload speed satisfying the upload speed threshold selected by the user, the content being sent to the application server via the storage device after the request is received.

9. The method of claim 8, where the determining whether the content is to be sent to the application server via the storage device includes:
   determining, based on the configuration information, that a network load is less than a network load threshold, the network load threshold being stored in the memory of the user device; and
   determining that the content is to be sent to the application server via the storage device based on the network load being less than the network load threshold.

10. The method of claim 8, where the determining whether the content is to be sent to the application server via the storage device includes:
    determining that a particular time has occurred; and
    determining that the content is to be sent to the application server via the storage device based on an occurrence of the particular time.

11. The method of claim 8, where the determining whether the content is to be sent to application server via the storage device includes:
    determining that the user device is in a particular location; and
    determining that the content is to be sent to the application server via the storage device based on the user device being in the particular location.

12. The method of claim 8, further comprising:
    determining to upload other content from the user device to the storage device based on a memory capacity used by the user device exceeding a threshold amount of memory capacity; and sending the other content to the storage device for storage.

13. The method of claim 8, further comprising:
    configuring a cache application using the configuration information,
        the cache application being configured to cache content for a plurality of applications stored on the user device, and
        the user device using the cache application to cache the content and to send the content to the application server.

14. A non-transitory computer-readable medium storing instructions, the instructions comprising:
    one or more instructions that, when executed by one or more processors of a user device, cause the one or more processors to:
        receive configuration information,
            the configuration information instructing the user device about when to send content to a storage device,
            the configuration information indicating an upload speed threshold selected by a user of the user device for communicating the content via a service provider network;
        send the configuration information to a policy and charging rules function device included in the service provider network;
        receive a request from a user of the user device to send the content, from a memory associated with the user device, to an application server via the storage device,
            the storage device being included in an evolved packet system of the service provider network,
            the storage device facilitating communication, via the service provider network, of the content between the user device and the application server which is communicatively coupled to but not included in the service provider network;
        determine, based on the configuration information, whether the content is to be sent to the application server via the storage device based on whether an upload speed satisfies the upload speed threshold selected by the user,
            when the determining whether the content is to be sent, the one or more processors are to:
                wait until the upload speed is detected to satisfy the upload speed threshold selected by the user before sending the content to the application server via the storage device;
        cache the content, based on receiving the request from the user of the user device to send the content to the application server, while waiting until the upload speed is detected to satisfy the upload speed threshold;
        send a message to the storage device that the content is cached to be uploaded to the application server at a later time; and
        send the content to the application server via the storage device based on the upload speed satisfying the upload speed threshold selected by the user,
            the content being sent to the application server via the storage device after the request is received.

15. The non-transitory computer-readable medium of claim 14, where the one or more instructions, when executed by one or more processors of the user device, further cause the one or more processors to:
    determine, based on the configuration information, that a network load is less than a network load threshold, the network load threshold being stored in the memory of the user device; and
    determine that the content is to be sent to the application server via the storage device based on the network load being less than the network load threshold.

16. The non-transitory computer-readable medium of claim 14, where the one or more instructions, when executed by one or more processors of the user device, further cause the one or more processors to:
    determine that a particular time has occurred; and
    determine that the content is to be sent to the application server via the storage device based on an occurrence of the particular time.

17. The non-transitory computer-readable medium of claim 14, where the one or more instructions, when executed by one or more processors of the user device, further cause the one or more processors to:
    determine that the user device is in a particular location; and
    determine that the content is to be sent to the application server via the storage device based on the user device being in the particular location.

18. The non-transitory computer-readable medium of claim 14, where the one or more instructions, when executed by one or more processors of the user device, further cause the one or more processors to:
    determine to upload other content from the user device to the storage device based on a memory capacity used by the user device exceeding a threshold amount of memory capacity; and
    send the other content to the storage device for storage.

19. The non-transitory computer-readable medium of claim 14, where the one or more instructions, when executed by one or more processors of the user device, further cause the one or more processors to: receive the configuration information from the user of the user device.

* * * * *